US012601623B2

(12) United States Patent
Rieder et al.

(10) Patent No.: US 12,601,623 B2
(45) Date of Patent: Apr. 14, 2026

(54) CORIOLIS MASS FLOWMETER AND METHOD FOR MONITORING A CORIOLIS MASS FLOWMETER

(71) Applicant: Endress+Hauser Flowtec AG, Reinach (CH)

(72) Inventors: Alfred Rieder, Lörrach (DE); Rémy Scherrer, Oberdorf (FR); Johan Pohl, Freiburg (DE)

(73) Assignee: Endress+Hauser Flowtec AG, Reinach (CH)

( * ) Notice: Subject to any disclaimer, the term of this patent is extended or adjusted under 35 U.S.C. 154(b) by 302 days.

(21) Appl. No.: 18/563,153

(22) PCT Filed: Apr. 20, 2022

(86) PCT No.: PCT/EP2022/060402
§ 371 (c)(1),
(2) Date: Nov. 21, 2023

(87) PCT Pub. No.: WO2022/242976
PCT Pub. Date: Nov. 24, 2022

(65) Prior Publication Data
US 2024/0210228 A1      Jun. 27, 2024

(30) Foreign Application Priority Data

May 21, 2021     (DE) ..................... 10 2021 113 363.7

(51) Int. Cl.
  *G01F 1/84*           (2006.01)
  *G01F 25/10*          (2022.01)
(52) U.S. Cl.
  CPC ............ *G01F 1/845* (2013.01); *G01F 1/8436* (2013.01); *G01F 25/10* (2022.01); *G01F 1/84* (2013.01)

(58) Field of Classification Search
  CPC .......... G01F 1/845; G01F 1/8436; G01F 1/84; G01F 25/10; G01N 2009/006; G01N 9/002
  See application file for complete search history.

(56) References Cited

U.S. PATENT DOCUMENTS

| | | | | |
|---|---|---|---|---|
| 10,718,648 B2 * | 7/2020 | Zhu | ..................... | G01F 1/8436 |
| 10,724,883 B2 * | 7/2020 | Zhu | ..................... | G01F 15/04 |

(Continued)

FOREIGN PATENT DOCUMENTS

| | | |
|---|---|---|
| DE | 102009002941 A1 | 11/2010 |
| DE | 102010044179 A1 | 5/2012 |

(Continued)

*Primary Examiner* — Jonathan M Dunlap
(74) *Attorney, Agent, or Firm* — Kelly J. Smith; Endress+Hauser (USA) Holding, Inc.

(57) ABSTRACT

Monitoring a mass flowmeter includes ascertaining a resonant frequency of a bending oscillation, wanted mode, and a density measured value of a medium as a function of the frequency. A bending oscillation is excited outside of resonance with an excitation signal having an amplitude and a frequency ($\mu$ times the resonant frequency of the bending oscillation, wanted mode). An amplitude of a sensor signal of the bending oscillation outside of resonance is ascertained. A value of an integrity function of the measuring tube depending on a ratio of the sensor signal amplitude to the excitation signal amplitude of the bending oscillation is ascertained. The integrity function depends further on a density term of a transfer function that models contributions of a plurality of oscillation modes to the sensor signal. This function is reduced to reference conditions, and/or transformed to an integrity value, which has no cross sensitivities for media density.

11 Claims, 2 Drawing Sheets

ST

(56)                    References Cited

U.S. PATENT DOCUMENTS

2018/0231411 A1* 8/2018 Zhu ......................... G01F 15/04
2019/0154485 A1* 5/2019 Zhu ......................... G01N 9/002

FOREIGN PATENT DOCUMENTS

EP            2638367 B1     1/2020
WO           2014047887 A1     3/2021
WO     WO-2021047887 A1 *  3/2021    ........... G01F 15/022

* cited by examiner

CORIOLIS MASS FLOWMETER AND METHOD FOR MONITORING A CORIOLIS MASS FLOWMETER

CROSS-REFERENCE TO RELATED APPLICATIONS

The present application is related to and claims the priority benefit of DPMA Patent Application No. 10 2021 113 363.7, filed on May 21, 2021 and International Patent Application No. PCT/EP2022/060402, filed on Apr. 20, 2022, the entire contents of which are incorporated herein by reference.

TECHNICAL FIELD

The invention relates to a Coriolis mass flowmeter and to a method for its monitoring. European Patent EP 2 638 367 B1 relates to such a method, in the case of which a measuring tube oscillation in a bending oscillation mode of a measuring tube outside of resonance is excited with an excitation frequency, which has a fixed relationship with the eigenfrequency of the bending oscillation mode, in order to ascertain a value of a transfer function, which is formed by a ratio of a sensor signal amplitude of an oscillation sensor for registering the measuring tube oscillation and an excitation signal amplitude of an exciter for exciting the measuring tube oscillation.

BACKGROUND

Based on changes of the value of this transfer function, changes of the mass flowmeter can be detected early, especially a change of the elastic properties of the measuring tube, which can be caused by abrasion or corrosion. The excitation outside of resonance is, on the one hand, advantageous, since the transfer function is then essentially independent of the quality of the oscillating measuring tube, which can vary by a number of orders of magnitude. On the other hand, in the absence of the larger response of resonance of the excited bending oscillation mode, the relative importance of the contribution of neighboring bending oscillation modes in the sensor signal increases, such that the neighboring bending oscillation modes cannot be neglected. In such case, it is, additionally, to be noted that the relative importance of the contribution of neighboring bending oscillation modes is variable, and, especially, density dependent.

SUMMARY

It is, consequently, an object of the invention to provide an improved monitoring method and a Coriolis mass flowmeter implementing such method for taking the above issues into consideration. The object is achieved by the method and the Coriolis mass flowmeter as defined in the present disclosure.

The method of the invention for monitoring a Coriolis mass flowmeter having at least one oscillatable measuring tube for conveying a medium comprises: ascertaining the resonant frequency of a bending oscillation, wanted mode; ascertaining a density measured value of a medium conveyed in the measuring tube as a function of the resonant frequency; exciting a bending oscillation outside of resonance with an excitation signal, which has an excitation signal amplitude and an excitation frequency, which amounts to µ times the resonant frequency of the bending oscillation, wanted mode; registering a sensor signal and ascertaining a sensor signal amplitude of the bending oscillation outside of resonance; ascertaining a value of an integrity function of the measuring tube depending on a ratio of the sensor signal amplitude of the bending oscillation to the excitation signal amplitude of the bending oscillation, wherein the integrity function depends further on a density dependent term of a transfer function, wherein the density dependent term of the transfer function models contributions of a plurality of oscillation modes to the sensor signal, wherein the integrity function by means of the density dependent term of the transfer function is reduced to reference conditions, and/or transformed to an integrity value, which has no cross sensitivities to media density.

In general, a transfer function $T(\omega)$ models a ratio $U(\omega)/I(\omega)$ dependent on an exciter angular frequency $\omega=2\pi f$, wherein f is the exciter frequency and $U(\omega)$ as well as $I(\omega)$ refer, respectively, to a sensor voltage signal amplitude and an exciter current signal amplitude at the exciter angular frequency $\omega$. Especially in the case of an electrodynamic sensor, the sensor voltage signal amplitude $U(\omega)$ is velocity proportional, thus, proportional to the oscillation amplitude of the measuring tube at the site of the sensor and proportional to the oscillation frequency.

In a further development of the invention, the density dependent term of the transfer function models a ratio of sensor signal amplitude and excitation signal amplitude as a function of the excitation frequency and the media density.

In a further development of the invention, the density dependent term of the transfer function comprises summands, which are proportional to the contribution of individual oscillation modes to the sensor signal, wherein the contribution of an oscillation mode depends on the ratio of the excitation frequency to the eigenfrequency of the oscillation mode.

The transfer function can then be expressed, for example, as:

$$T(\omega)=j\omega e_s e_d \Sigma A_i(\omega,\omega_i(\rho)) \tag{1}$$

In such case, $e_s$ and $e_d$ are effectiveness coefficients of the oscillation sensor and of the exciter, respectively. They describe, thus, a voltage per velocity, or a force per electrical current.

The modal contributions $A_i(\omega, \omega_i(\rho))$ can be expressed as:

$$A_i(\omega, \omega_i(\rho)) = \frac{n_i}{1 + j\dfrac{\omega}{\omega_i(\rho)Q_i} - \left(\dfrac{\omega}{\omega_i(\rho)}\right)^2} \tag{II}$$

In such case, $\omega_i(\rho)$ is the eigen(angular frequency) of a bending oscillation mode dependent on the media density $\rho$ and $Q_i$ is the quality of such bending oscillation mode.

The expression $n_i$ represents an effective modal excitability of a bending oscillation mode, wherein, such as here, the density dependent term of the transfer function according to another development of the invention models contributions of individual oscillation modes to the sensor signal as proportional to the effective modal excitability.

The effective modal excitability is especially proportional to a quotient of the product of a normalized modal oscillation amplitude at the site of the exciter and a normalized modal oscillation amplitude at the site of the sensor divided by a modal stiffness of the measuring tube. The normalizing of the modal oscillation amplitudes can, for example, occur such that the integral of a modal oscillation amplitude along the measuring tube, in each case, assumes the value 1.

In a further development of the invention, the density dependent term of the transfer function relates the modal excitabilities of two oscillation modes by a mode specific proportionality factory.

In a further development of the invention, the density dependent term of the transfer function models contributions of individual oscillation modes to the sensor signal, in each case, free of damping.

In a further development of the invention, the density dependent term of the transfer function models the eigenfrequencies of the oscillation modes as proportional to one another.

In a further development of the invention, the density dependent term of the transfer function models a mode specific proportionality factor between the eigenfrequencies of two oscillation modes as a function $f_i(\rho)$ of the density measured value.

If one considers that the exciter angular frequency a differs by a constant factor $\mu$ from the eigen(angular frequency) $\omega_1$ of a bending oscillation, wanted mode, wherein, for example, $1.05 < \mu < 1.5$, then the modal contributions $A_i$ can be expressed as:

$$A_i(\mu, \rho) = \frac{n_1}{1-\mu^2}\gamma_i\frac{1-\mu^2}{1-\left(\dfrac{\mu}{f_i(\rho)}\right)^2} \qquad \text{(III)}$$

In a further development of the invention, the function is a linear function of density measured value, thus, for example:

$$f_i(\rho) = a_i + b_i \cdot (\rho - \rho_{ref}) \qquad \text{(IV)}$$

In such case, $a_i$ and $b_i$ are mode specific coefficients, and $\rho_{ref}$ is a reference density, for example, 1000 kg/m³.

With the following definition $$B_i(\mu, \rho) = \frac{1-\mu^2}{1-\left(\dfrac{\mu}{f_i(\rho)}\right)^2} \qquad \text{(V)}$$

the transfer function can be written as:

$$T(\omega_1, \mu, \rho) = \frac{U(\omega_1\mu)}{I(\omega_1\mu)} = j\omega_1\mu e_s e_d\frac{n_1}{1-\mu^2}\sum \gamma_i B_i(\mu, \rho) \qquad \text{(VI)}$$

An integrity function HBSI cleaned of density dependence can then be defined as:

$$HBSI = e_s e_d n_1 2\pi = \left(\sum \gamma_i B_i(\mu, \rho)\right)^{-1}\frac{U}{I}\frac{1-\mu^2}{\mu f_1} \qquad \text{(VII)}$$

This expression describes a product of sensor sensitivity $e_s$, exciter effectiveness $e_d$ and modal flexibility $n_1$ of the bending oscillation, wanted mode. Values for the integrity function are in the case of knowledge of the proportionality factors $\gamma_i$ and $B_i$ simple to determine by registering values of the transfer function U/I.

A simplified variant of an integrity function $HBSI_{raw}$ is $$HBSI_{raw}(\rho) = \frac{U}{I}\frac{1-\mu^2}{\mu f_1} \qquad \text{(VIII)}$$

Values for $HBSI_{raw}$ follow directly after the registering of values for the transfer function U/I.

The simplified integrity function $HBSI_{raw}$ has a density dependence, such as can be seen by a comparison of the definitions in Equations (VII) and (VIII). In accordance therewith, $$HBSI_{raw}(\rho) = HBSI \cdot \Sigma\gamma_i B_i(\mu,\rho) \qquad \text{(IX)}$$

In order nevertheless to be able to perform a reliable monitoring with the simplified integrity function $HBSI_{raw}$, a reduction of values of the simplified integrity function won in the case of densities $\rho$ to corresponding values at reference density $\rho_{ref}$ is required. In this regard, a correction function $f_{dens}(\rho)$ can be defined as follows:

$$f_{dens}(\rho) = \frac{HBSI_{raw}(\rho_{ref})}{HBSI_{raw}(\rho)} = \frac{\sum \gamma_i B_i(\mu, \rho_{ref})}{\sum \gamma_i B_i(\mu, \rho)} \qquad \text{(X)}$$

With this correction function $f_{dens}(\rho)$, the simplified integrity function can for comparability be reduced to reference conditions as follows:

$$HBSI_{raw}(\rho_{ref}) = f_{dens}(\rho)HBSI_{raw}(\rho) \qquad \text{(XI)}$$

In a further development of the invention, the transfer function models besides the contribution of the bending oscillation, wanted mode the contribution to the sensor signal of only one additional oscillation mode. In such case, the transfer function can be written as:

$$T(\omega_1, \mu, \rho) = j\omega_1\mu e_s e_d\frac{n_1}{1-\mu^2}\left(1+\gamma\frac{1-\mu^2}{1-\left(\dfrac{\mu}{f(\rho)}\right)^2}\right) \qquad \text{(XII)}$$

With a linear function for $f(\rho)$ according to equation (IV), then:

$$T(\omega_1, \mu, \rho) = j\omega_1\mu e_s e_d\frac{n_1}{1-\mu^2}\left(1+\gamma\frac{1-\mu^2}{1-\left(\dfrac{\mu}{\alpha+\beta(\rho-\rho_{ref})}\right)^2}\right) \qquad \text{(XIII)}$$

A corresponding density independent integrity function can be written, for example, as:

$$HBSI = \frac{1}{1+\gamma\dfrac{1-\mu^2}{1-\left(\dfrac{\mu}{\alpha+\beta(\rho-\rho_{ref})}\right)^2}}\frac{U}{I}\frac{1-\mu^2}{\mu f_1} \qquad \text{(XIV)}$$

With the following definition of a function $C(\rho)$ $$C(\rho) = \frac{1-\mu^2}{1-\left(\dfrac{\mu}{\alpha+\beta(\rho-\rho_{ref})}\right)^2} \qquad \text{(XV)}$$

-continued then:

$$HBSI = \frac{1}{1 + \gamma C(\rho)} \frac{U}{I} \frac{1 - \mu^2}{\mu f_1} \qquad \text{(XVI)}$$

In this embodiment, for implementing the method of the invention, only the determining of three parameters is required, namely the coefficients $\alpha$, $\beta$ of the linear function of the density dependence and the excitability coefficient $\gamma$.

In a further development of the invention, the coefficients $\alpha$, $\beta$ of the linear function of the density dependence and the excitability coefficient $\gamma$ are ascertained type specifically and provided in data memories of the measuring- and operating circuit of Coriolis mass flowmeters of the invention, wherein the excitability coefficient $\gamma$ undergoes an individual matching, preferably for each example of a Coriolis mass flowmeter, preferably in an initial, especially factory determination of device parameters.

A corresponding correction function $f_{dens}(\rho)$ for the simplified integrity function $HBSI_{raw}$ in the case of the transfer function according to equation (XIII) can be expressed as:

$$f_{dens}(\rho) = \frac{1 + \gamma C(\rho_{ref})}{1 + \gamma C(\rho)} \qquad \text{(XVII)}$$

By multiplication of a measured value of the simplified integrity function $HBSI_{raw}(\rho)$ with the correction function $f_{dens}(\rho)$, the measuring result is in another development of the invention reduced to the value of the simplified integrity function under reference conditions, $HBSI_{raw}(\rho_{ref})$.

When the value of the integrity function HBSI or the simplified integrity function changes under reference conditions $HBSI_{raw}(\rho_{ref})$ beyond a tolerance value, such is an indication of a change of a modal stiffness of a measuring tube, a sensor sensitivity or an exciter effectiveness. In a further development of the invention, in such case, a corresponding error report is output. It is known that these variables have cross sensitivities to temperature. In a further development of the invention, these cross sensitivities are taken into consideration, in order to provide a temperature independent value of the integrity function HBSI or the simplified integrity function $HBSI_{raw}$.

The Coriolis mass flowmeter of the invention comprises: at least one oscillatable measuring tube for conveying a medium; at least one exciter for exciting bending oscillations of the measuring tube as a function of an excitation signal; at least one oscillation sensor for registering the bending oscillations of the at least one measuring tube and for outputting an oscillation dependent sensor signal; and at least one measuring- and operating circuit for supplying the exciter with an excitation signal and for registering the sensor signal, wherein the measuring- and operating circuit is adapted to perform the method of the invention.

BRIEF DESCRIPTION OF THE DRAWINGS

FIG. 1a shows a side view of an example of an embodiment of a Coriolis mass flowmeter of the present disclosure;

FIG. 1b shows a perspective view of the example of an embodiment of the Coriolis mass flowmeter of the present disclosure shown in FIG. 1a;

FIG. 3b shows a graph of density dependent correction functions $f_{dens}(\rho)$, whose coefficients are determined based on the values of the density dependent simplified integrity function $HBSI_{raw}(\rho)$ in FIG. 3a.

DETAILED DESCRIPTION

Figures 1A, 1B:
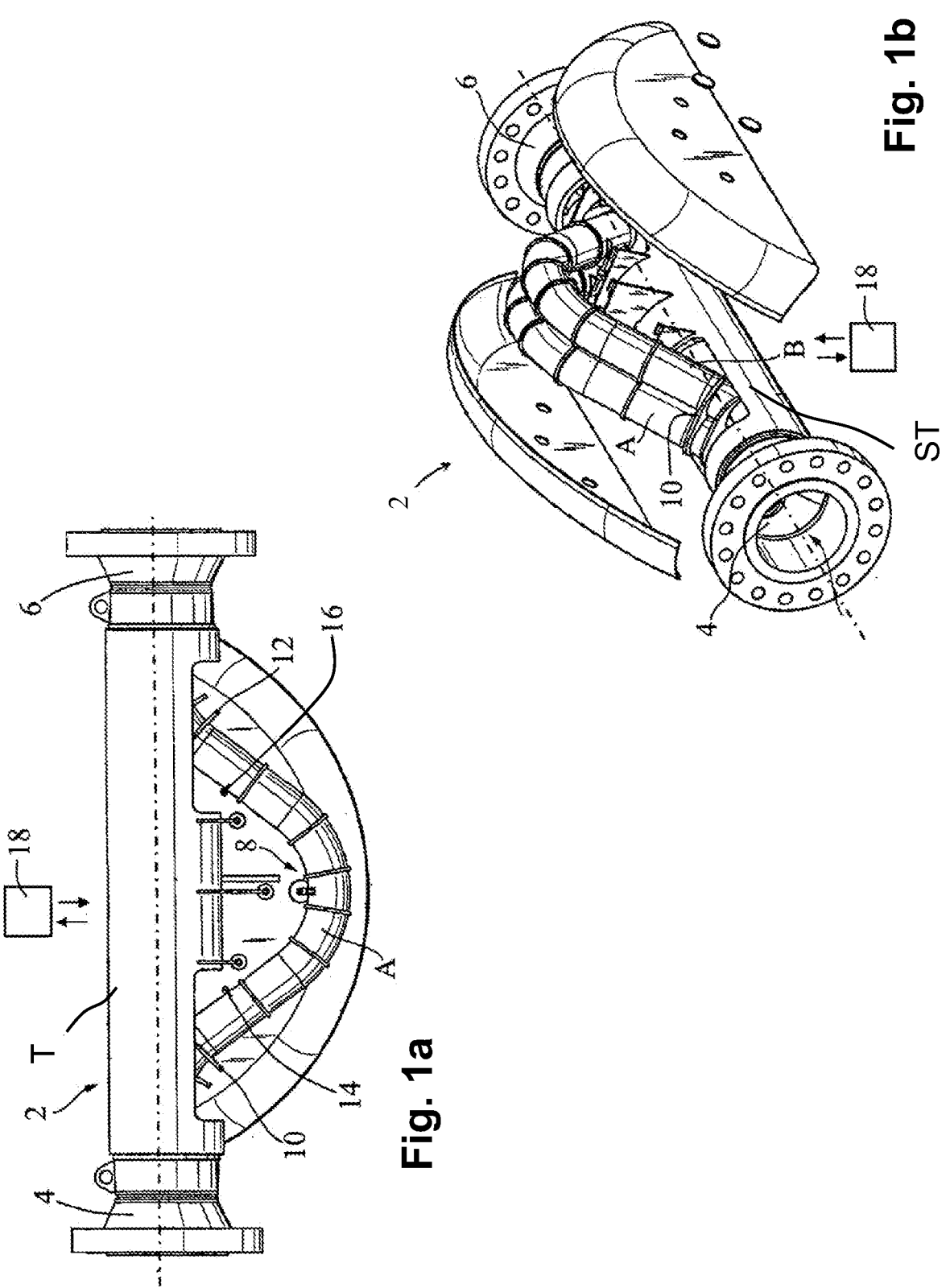

Shown in FIGS. 1a and 1b is an example of an embodiment of a Coriolis mass flowmeter 2 of the invention, which is adapted for performing the method of the invention. The Coriolis mass flowmeter 2 includes two oscillatably held measuring tubes A and B, each of which is bent and extends parallel to the other. Coriolis mass flowmeter 2 is insertable in such a manner into a pipeline that a fluid flowing in the pipeline flows through the two measuring tubes A, B. Forming the interfaces, respectively, at the inlet side, and at the outlet side, between the measuring tubes A, B and the pipeline are manifolds 4, 6, which are connected rigidly together by a support tube ST. In this way, the inlet side and outlet side end sections of the measuring tubes are also coupled with the support tube ST, whereby relative movements between the inlet side and outlet side end sections of the measuring tubes are effectively suppressed. Arranged between the two measuring tubes A, B is an electrodynamic exciter 8, as a result of which the two measuring tubes A, B are excitable to execute bending oscillations relative to one another, wherein a free oscillatory length of the measuring tubes A, B is established by coupling elements 10, 11, with which the measuring tubes are mechanically coupled together at the inlet side and at the outlet side. Arranged between the two measuring tubes A, B at, respectively, inlet side and outlet side sections are electrodynamic oscillation sensors 14, 16. While FIGS. 1a and 1b show an example of an embodiment of a Coriolis mass flowmeter having a pair of bent measuring tubes in the rest position, the invention relates equally to Coriolis mass flowmeters having a single measuring tube or those with a plurality of pairs of measuring tubes. Equally, instead of the illustrated, bent measuring tubes having a mirror symmetry relative to a measuring tube transverse plane, also S shaped measuring tubes or straight measuring tubes can be used for implementing the invention.

Coriolis mass flowmeter 2 includes, additionally, an operating- and evaluation circuit 18 for supplying the exciter 8 with an exciter current and for registering and evaluating measurement signals of the electrodynamic oscillation sensors 14, 16. The measuring- and operating circuit is especially adapted to perform the method of the invention for monitoring the Coriolis mass flowmeter. This includes the determining of values of an integrity function, in order to be able early to detect changes in the Coriolis mass flowmeter.

Figure 2:
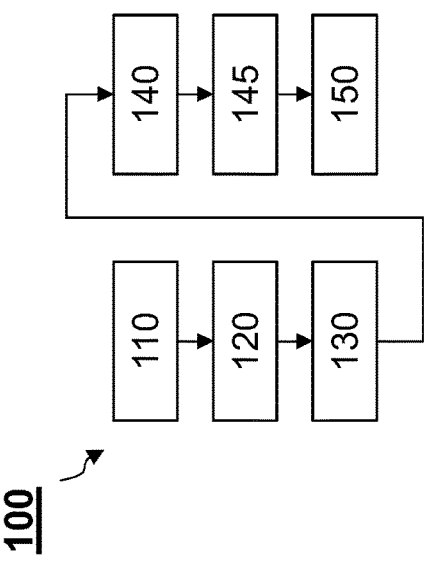
FIG. 2 shows a flowchart of an example of an embodiment of a method of the present disclosure.

An example of an embodiment of the method of the invention will now be explained based on FIG. 2.

The method 100 begins with the ascertaining 110 of a resonant frequency $f_1$ of a bending oscillation, wanted mode of the Coriolis mass flowmeter. Such can in the case of the device shown in FIGS. 1a and 1b especially be the so-called $f_1$ mode, in which the two measuring tubes oscillate with opposite phase relative to one another without oscillation nodes between the coupling elements. Based on such resonant frequency $f_1$, there occurs in a second step 120 the determining of density measured value for the medium conveyed in the measuring tubes.

For ascertaining the integrity function, there occurs the exciting 130 of the bending oscillation, wanted mode outside of resonance at $\mu$ times the resonant frequency with an exciter current, which has an exciter electrical current amplitude I, wherein $\mu$ assumes especially the value 1.2.

There follows the registering 140 of a sensor signal and the ascertaining 145 of a sensor signal amplitude U of the bending oscillation outside of resonance.

Based on the sensor signal amplitude U and the exciter electrical current amplitude I, there follows then the ascertaining 150 of a value of an integrity function. Such can be, for example, a value of an integrity function HBSI or a value of a simplified integrity function $HBSI_{raw}(\rho_{ref})$ reduced to a reference density, wherein the reference density $\rho_{ref}$ is especially the density of water.

As explained above, there follows for the integrity function HBSI based on Equations (XV) and (XVI):

$$HBSI = \frac{U}{I}\frac{1-\mu^2}{\mu f_1}\frac{1}{1+\gamma C(\rho)}$$

where:

$$C(\rho) = \frac{1-\mu^2}{1-\left(\dfrac{\mu}{\alpha+\beta(\rho-\rho_{ref})}\right)^2}$$

Correspondingly, there follows for the simplified integrity function $HBSI_{raw}(\rho_{ref})$ based on Equations (VIII), (XI) and XVII):

$$HBSI_{raw}(\rho_{ref}) = \frac{U}{I}\frac{1-\mu^2}{\mu f_1} f_{dens}(\rho)$$

where:

$$f_{dens}(\rho) = \frac{1+\gamma C(\rho_{ref})}{1+\gamma C(\rho)}$$

The implementing of the method of the invention for a given Coriolis mass flowmeter requires only the determining of three parameters, namely the coefficients $\alpha$, $\beta$ of the linear function of the density dependence and the excitability coefficient $\gamma$. In such case, it has been found that the coefficients $\alpha$, $\beta$ of the linear function of the density dependence are essentially constant for a device type, and only the excitability coefficient $\gamma$ exhibits individual variations. Thus, it is, in most cases, sufficient to determine the coefficients of the linear function of the density dependence once for a device type and only check the excitability coefficient example specifically. The procedure for this, will now be explained based on FIGS. 3a to 3c.

For characterizing especially a factory new Coriolis mass flowmeter, its measuring tubes are supplied with media over a large density range and caused to oscillate at $\mu$ times the resonant frequency of a bending oscillation, wanted mode, especially the $f_1$ mode, in order to ascertain the particular transfer function U/I and therewith the values of the density dependent simplified integrity function $HBSI_{raw}(\rho)$.

$$HBSI_{raw}(\rho) = \frac{U}{I}\frac{1-\mu^2}{\mu f_1}$$

Suitable media for this are water as medium with a reference density $p_{ref}$ of, for instance, 1000 kg/m$^3$, and air with a density $\rho$ of, for instance, 1.2 kg/m$^3$, while higher densities up to 3100 kg/m$^3$ can be achieved with solutions of sodium polytungstate.

Figure 3B:
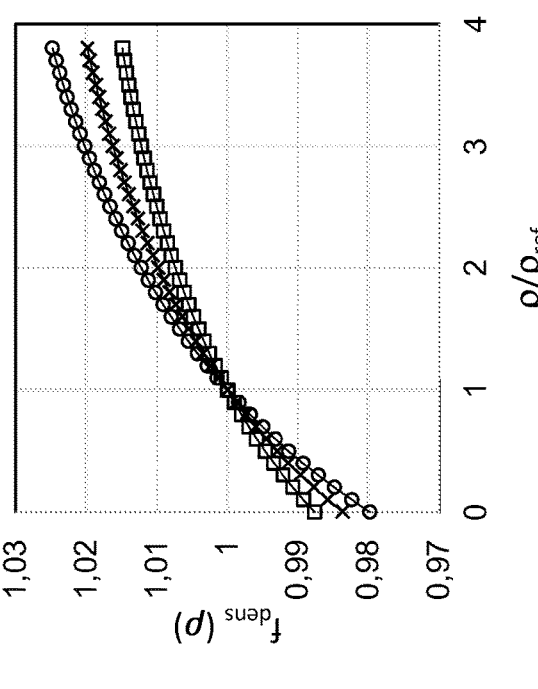
Figure 3C:
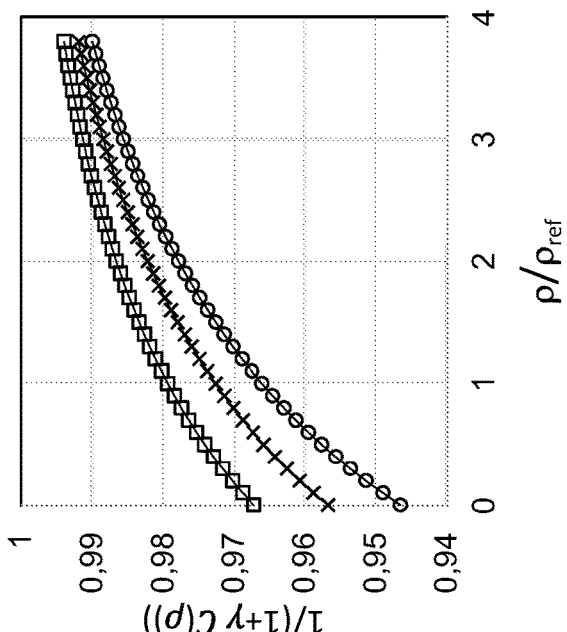
FIG. 3c shows a graph with density dependent functions, whose coefficients are determined based on the values of the density dependent simplified integrity function $HBSI_{raw}(\rho)$ in FIG. 3a, and which serve to reduce values of the density dependent simplified integrity function $HBSI_{raw}(\rho)$ to values of the density independent integrity function HBSI.
Figure 3A:
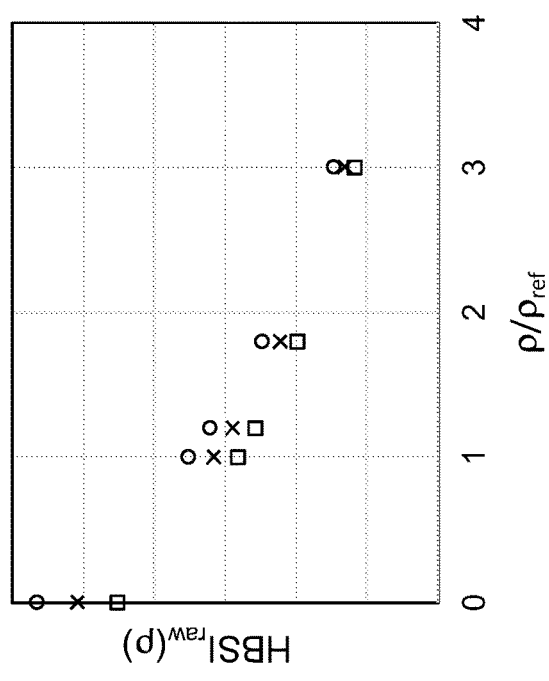
FIG. 3a shows a graph with values of the density dependent simplified integrity function $HBSI_{raw}(\rho)$.

FIG. 3a shows observed values of the density dependent simplified integrity function $HBSI_{raw}(\rho)$. The illustrated data points in such case come from different examples of the same measuring device type, wherein equal symbols designate data from a specific example.

FIG. 3b shows example specific correction functions $f_{dens}(\rho)$, with which values of $HBSI_{raw}(\rho)$ are reduced to the value of $HBSI_{raw}(\rho_{ref})$, wherein $f_{dens}(\rho_{ref})$ according to definition assumes the value 1 and holds in general.

Using $$f_{dens}(\rho) = \frac{1+\gamma C(\rho_{ref})}{1+\gamma C(\rho)}$$

and $$C(\rho) = \frac{1-\mu^2}{1-\left(\dfrac{\mu}{\alpha+\beta(\rho-\rho_{ref})}\right)^2}$$

the unknown, example specific coefficients $\alpha$, $\beta$ and $\gamma$ are determined based on the data in FIG. 3a, wherein it has been found that the coefficients $\alpha$, $\beta$ for examples of a device type can be assumed to be constant. Solely the coefficient $\gamma$ exhibits individual variations, such that it is ascertained example specifically.

Thus, with earlier ascertained coefficients, the example specific functions $1/(1+\gamma^*C(\rho))$ shown in FIG. 3c can be ascertained, with which a measured value of the density dependent simplified integrity function $HBSI_{raw}(\rho)$ can be reduced to a value of the density independent integrity function HBSI according to $$HBSI = HBSI_{raw}(\rho)\frac{1}{1+\gamma C(\rho)}$$

The invention claimed is:

1. A method for monitoring a Coriolis mass flowmeter having at least one oscillatable measuring tube for conveying a medium, comprising:

ascertaining a resonant frequency of a bending oscillation, wanted mode of the Coriolis mass flowmeter;

ascertaining a density measured value of a medium conveyed in the measuring tube as a function of the resonant frequency;

exciting a bending oscillation outside of resonance with an excitation signal, which has an excitation signal amplitude and an excitation frequency, which amounts to u times the resonant frequency of the bending oscillation, wanted mode;

registering a sensor signal and ascertaining a sensor signal amplitude of the bending oscillation outside of resonance;

ascertaining a value of an integrity function of the measuring tube depending on a ratio of the sensor signal amplitude of the bending oscillation to the excitation signal amplitude of the bending oscillation, wherein the integrity function depends further on a density dependent term of a transfer function, wherein the density dependent term of the transfer function models contributions of a plurality of oscillation modes to the sensor signal, wherein the integrity function by means of the density dependent term of the transfer function is reduced to reference conditions, and/or transformed to an integrity value, which has no cross sensitivities to media density.

2. The method as claimed in claim 1, wherein the transfer function models a ratio of sensor signal amplitude and excitation signal amplitude as a function of the excitation frequency and the media density.

3. The method as claimed in claim 1, wherein the density dependent term of the transfer function comprises summands, which are proportional to the contribution of individual oscillation modes to the sensor signal, wherein the contribution of an oscillation mode depends on the ratio of the excitation frequency to the eigenfrequency of the oscillation mode.

4. The method as claimed in claim 3, wherein the density dependent term of the transfer function models the eigenfrequencies of the oscillation modes as proportional to one another.

5. The method as claimed in claim 4, wherein the density dependent term of the transfer function models a mode specific proportionality factor between the eigenfrequencies of two oscillation modes as a function of density measured value.

6. The method as claimed in claim 5, wherein the function is a linear function of density measured value.

7. The method as claimed in claim 3, wherein the density dependent term of the transfer function models contributions of individual oscillation modes to the sensor signal as proportional to an effective modal excitability.

8. The method as claimed in claim 7, wherein the density dependent term of the transfer function relates the modal excitabilities of two oscillation modes by a proportionality factor.

9. The method as claimed in claim 1, wherein the density dependent term of the transfer function models contributions of individual oscillation modes to the sensor signal, in each case, free of damping.

10. The method as claimed in claim 1, wherein the density dependent term of the transfer function models besides the contribution of the bending oscillation, wanted mode the contribution to the sensor signal of only one additional oscillation mode.

11. A Coriolis mass flowmeter, comprising:

at least one oscillatable measuring tube for conveying a medium;

at least one exciter for exciting bending oscillations of the measuring tube as a function of an excitation signal;

at least one oscillation sensor for registering the bending oscillations of the at least one measuring tube and for outputting an oscillation dependent sensor signal; and at least one measuring- and operating circuit for supplying the exciter with an excitation signal and for registering the sensor signal, wherein the measuring- and operating circuit is adapted to perform the following method:

ascertaining a resonant frequency of a bending oscillation, wanted mode of the Coriolis mass flowmeter;

ascertaining a density measured value of a medium conveyed in the measuring tube as a function of the resonant frequency;

exciting a bending oscillation outside of resonance with an excitation signal, which has an excitation signal amplitude and an excitation frequency, which amounts to u times the resonant frequency of the bending oscillation, wanted mode;

registering a sensor signal and ascertaining a sensor signal amplitude of the bending oscillation outside of resonance;

ascertaining a value of an integrity function of the measuring tube depending on a ratio of the sensor signal amplitude of the bending oscillation to the excitation signal amplitude of the bending oscillation, wherein the integrity function depends further on a density dependent term of a transfer function, wherein the density dependent term of the transfer function models contributions of a plurality of oscillation modes to the sensor signal, wherein the integrity function by means of the density dependent term of the transfer function is reduced to reference conditions, and/or transformed to an integrity value, which has no cross sensitivities to media density.

* * * * *